July 22, 1958  E. J. COLEMAN  2,844,178
AIRCRAFT JETTISONABLE FUEL TANK
Filed April 29, 1957
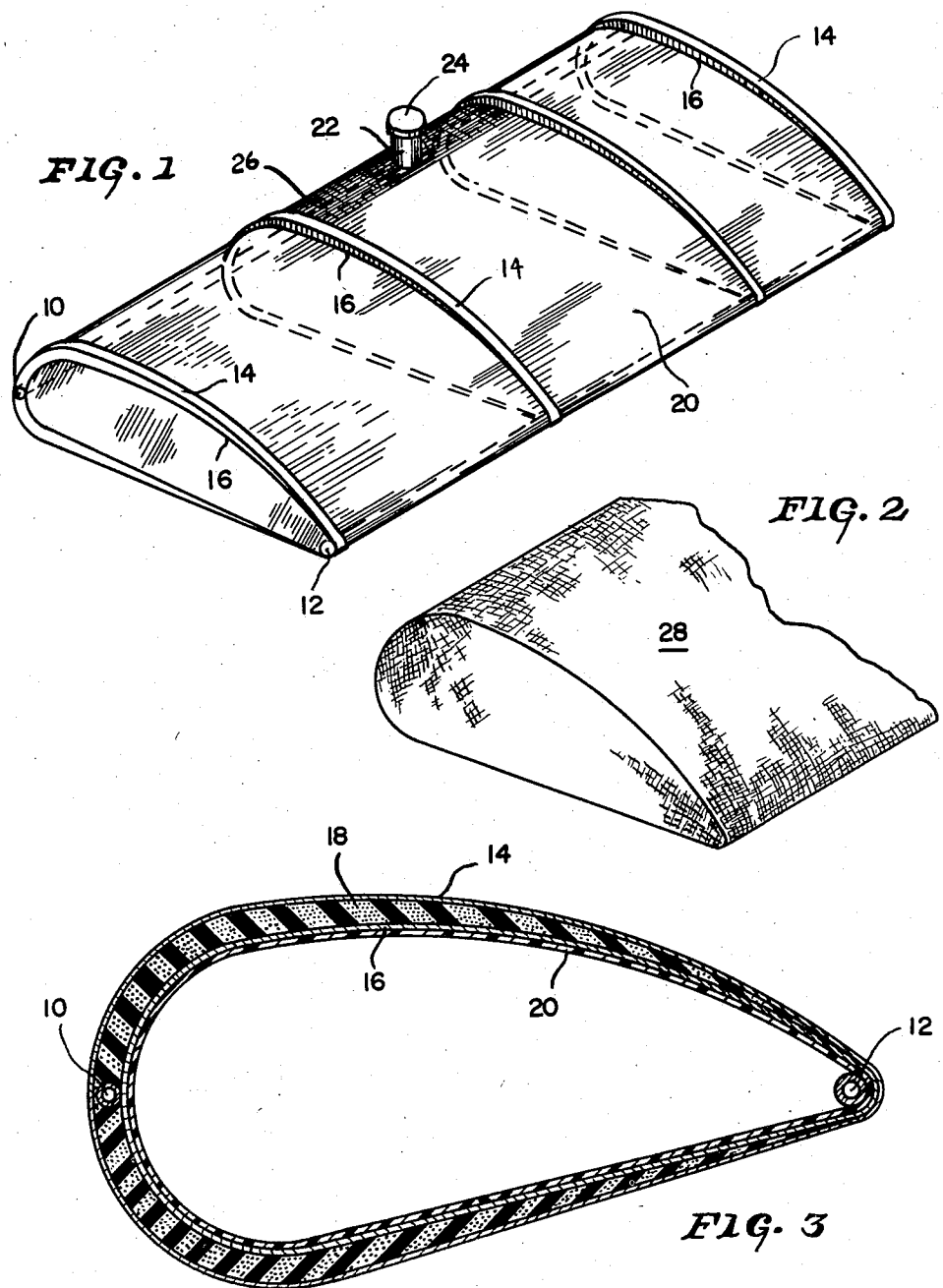
INVENTOR.
EDWIN J. COLEMAN
BY Alfred E. Miller
ATTORNEY

United States Patent Office 2,844,178
Patented July 22, 1958

2,844,178
AIRCRAFT JETTISONABLE FUEL TANK

Edwin J. Coleman, Glenbrook, Conn.

Application April 29, 1957, Serial No. 655,784

5 Claims. (Cl. 150—.5)

The present invention relates to aircraft wing fuel tanks and more particularly to a light weight fuel tank which may be jettisoned at will by the pilot.

Aircraft fuel tanks are frequently jettisoned upon fuel depletion or in an emergency when weight is a vital factor in maintaining the aircraft in flight. Many times in cases of emergency, the pilot and other flight personnel, because of time limitations, cannot choose unpopulated areas for the release of wing fuel tanks. Thus, in order to reduce to a minimum the amount of damage to persons and property in the event that a fuel tank or fuel tanks are dropped in populated areas the present invention relates to an extremely light weight, semirigid aircraft jettison fuel tank.

A further object of the present invention is to provide an aircraft wing fuel tank which is simple and inexpensive to manufacture while being exceedingly durable in construction and effective for the purposes intended.

Another object of the present invention is to provide a fuel tank assuming the desired streamlined tear-drop shape, said tank being protected against breakage by rough handling.

The above and other features, objects and advantages of the present invention will be fully understood from the following description considered in connection with the accompanying illustrative drawings.

Fig. 1 is a perspective view of the aircraft wing fuel tank construction in accordance with my invention with outer protective covering removed for the sake of clarity, Fig. 2 is a partial perspective view thereof illustrating the outer covering fitted around the fuel tank, Fig. 3 is a sectional view of the present aircraft wing fuel tank with the cover removed.

Referring more particularly to the drawing, the present aircraft wing fuel tank constructed in accordance with the present invention comprises a preferably tubular leading spar 10 constituted of aluminum or other light weight metal. It is to be understood that a spar manufactured of flat metal stock or other desirable configuration is within the scope of the present invention. Spaced from the leading spar 10 is a trailing spar 12 which may be of a tubular form or may assume any other suitable shape. Secured to both the leading spar 10 and the trailing spar 12 are a plurality of flexible ribs 14 and 16 composed of steel, aluminum or any other suitable light-weight metal. The ribs 14 and 16 each assume a generally elliptical shape. There are two sets of ribs 14 and 16 being spaced in inboard and outboard positions and having therebetween a resilient substance such as sponge rubber 18. The sponge rubber insert 18 serves to separate the metallic ribs and thereby quench vibration. Spaced transverse to the longitudinal axis of the aircraft wing fuel tank are a multiplicity of supporting ribs 14 and 16. Secured in a suitable manner to the supporting rib 16 and to the trailing spar 12 is an inner liner 20 of a suitable synthetic sheet material which is impervious to and non-destructible by aircraft fuels. The inner liner 20 thus assumes the general shape created by the supporting ribs 14 and 16 which is a general tear drop configuration. Because of the flexibility of the present rib and inner liner construction the fuel tank may contract or expand depending upon the fuel supply and flight altitude without any danger of fuel tank rupture. Located centrally of the fuel tank is a fuel tank entry 22 and a filler cap 24. Adjacent to the fuel tank entry 22 is a reinforced section 26 preferably constituted of a plasti-glass fibre laminate which is secured on both ends to supporting ribs 16. Covering the entire inner liner 20 and having a shape conformable to the present aircraft fuel wing tank is an outer, relatively strong cover 28 constituted preferably of a heavy canvas or duck cloth material. The cover 28 fits over the entire aircraft fuel wink tank and has an opening (not shown) for the projection of the fuel tank entry 22 and the cap 24 therethrough. With reference to the sectional view of Fig. 3 the cover 28 will completely surround flexible rib 14. The cloth material may be chemically treated in order to impart flexural strength thereto and to resist moisture absorption.

The present aircraft fuel wing tank has been constructed to decrease manufacturing costs, to decrease the fuel tank weight and to reduce the hazards concomitant with jettisoned fuel tanks.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What I claim is:

1. A jettisonable aircraft fuel tank comprising a plurality of elliptically-shaped flexible supporting ribs, means mounting said supporting ribs in superposed pairs at spaced intervals along the length of said fuel tank, resilient material secured between each superposed pair of supporting ribs, a plastic inner liner secured to a plurality of inboard supporting ribs, a closable fuel entry means, and an outer cover of relatively stiff material conforming to the configuration of said fuel tank.

2. A jettisonable aircraft fuel tank comprising a plurality of flexible supporting ribs, a leading spar and a trailing spar spaced therefrom defining the width of said fuel tank, said spars mounting said supporting ribs transverse thereto in superposed pairs at spaced intervals along the length of said fuel tank, resilient material secured between each superposed pair of supporting ribs, a plastic inner liner secured to one of each pair of supporting ribs, a closable fuel entry means, and an outer cover of relatively stiff material conforming to the configuration of said fuel tank.

3. A jettisonable aircraft fuel tank comprising a plurality of flexible supporting ribs, means mounting said supporting ribs in superposed pairs at spaced intervals along the length of said fuel tank, sponge rubber material secured between each superposed pair of supporting ribs, a plastic inner liner secured to one of each pair of supporting ribs, a closable fuel entry means, and an outer cover of relatively stiff material conforming to the configuration of said fuel tank.

4. A jettisonable aircraft fuel tank as set forth in claim 2 wherein said supporting ribs are constituted of light weight metal, and said leading and trailing spars are circular in cross-section.

5. A jettisonable aircraft fuel tank comprising a plurality of flexible supporting ribs, means mounting said supporting ribs in superposed pairs at spaced intervals along the length of said fuel tank, resilient material secured between each superposed pair of supporting ribs, a plastic inner liner secured to one of each pair of supporting ribs, a closable fuel entry means, a reinforcing strip surrounding said fuel entry means and secured to selected supporting ribs, an outer covering of heavy canvas material conforming to the configuration of said fuel tank.

References Cited in the file of this patent

UNITED STATES PATENTS

| | | |
|---|---|---|
| 1,897,438 | Mykol | Feb. 14, 1933 |
| 2,421,613 | Gray et al. | June 3, 1947 |
| 2,492,699 | Houwink | Dec. 27, 1949 |
| 2,633,172 | Treiber | Mar. 31, 1953 |
| 2,724,418 | Krupp | Nov. 22, 1955 |